United States Patent [19]

Yao

[11] 4,044,398

[45] Aug. 23, 1977

[54] SYSTEM FOR INTERFACING KEYBOARD-OPERATED APPARATUS WITH ELECTRICAL DATA SIGNALS

[75] Inventor: Szee Ming Yao, Norwalk, Conn.

[73] Assignee: Abbott Coin Counter Co., Inc., Greenwich, Conn.

[21] Appl. No.: 647,860

[22] Filed: Jan. 9, 1976

[51] Int. Cl.² .............................................. G06F 1/00
[52] U.S. Cl. ............................ 364/900; 340/365 R; 235/156
[58] Field of Search ............. 445/1; 340/365 R, 172.5

[56] References Cited

U.S. PATENT DOCUMENTS

| | | | |
|---|---|---|---|
| 3,394,368 | 9/1968 | Carr | 340/365 R |
| 3,465,296 | 9/1969 | Drage | 340/172.5 |
| 3,636,521 | 1/1972 | Wallace | 445/1 |
| 3,833,765 | 9/1974 | Hilborn | 340/365 R |
| 3,913,721 | 10/1975 | Koplow | 340/172.5 |
| 3,964,062 | 6/1976 | Flagg | 340/365 R |

*Primary Examiner*—Thomas B. Habecker
*Attorney, Agent, or Firm*—Watson, Leavenworth, Kelton & Taggart

[57] ABSTRACT

The information content of electrical data signals is entered into a keyboard-operated device by a system having switches connected in parallel with key-operated calculator switches and circuitry for operating the switches separately in accordance with selective parts of such information content of the data signals.

8 Claims, 3 Drawing Figures

SYSTEM FOR INTERFACING KEYBOARD-OPERATED APPARATUS WITH ELECTRICAL DATA SIGNALS

FIELD OF THE INVENTION

This invention relates to systems for entering numeric information, defined in electrical data signals, in keyboard-operated apparatus, such as calculators of keyboard type having switches operated by depression of keys identifying numerals and functions.

BACKGROUND OF THE INVENTION

Presently known arithmetic calculators are generally unique input devices which are either keyboard operated, that is, by depression of keyboards keys, or do not involve a keyboard and are operated responsively to electrical data signals. The former variety are of desk-top type or hand held with a keyboard inclusive of numeric keys and so-called function keys, for example, decimal point (.) key, add (+) key, subtract (−) key, multiply (×) key and equals (=) key, or like end of computation key. Numeric information is first entered by depression of the numeric keys successively in decreasing order (hundreds, tens, units). The decimal point function key is next operated and thereafter the numeric decimal information is entered by depression of the numeric keys successively in decreasing order (tenths, hundredths, thousandths). The numeric information thus keyed into the calculator is transferred into the calculator arithmetic processor part by depression of one of the remaining function keys as the occasion demands. Thus, for entries preceding the final entry in a summation, the add function key is operated after the data is set up. For the final entry, it is customary to depress the equals function key to complete the summation and display the result thereof while clearing the processor part for further use.

Data entry discipline for the keyboard calculator is thus completely accomplished by the operator. Misoperation, such as key rollover, i.e., operation of keys to enter succeeding data during entry of current data, is simply observed on occurrence and corrected by the operator.

In the non-keyboard type of calculator, data entry discipline is controlled by various complex arrangements of circuitry and software adapted to sequentially shift data to arithmetic processing circuitry without intervention of the operator.

Applications arise at times for which the above-discussed unique input calculators are unsuited. For instance, where the numeric information is largely operator enterable with but an occasional resort to numeric information available only in electrical data signals, the desk-top or hand held calculator and the non-keyboard calculator are each independently insufficient and cost considerations may preclude the presence of both devices.

SUMMARY OF THE INVENTION

It is an object of the present invention to provide keyboard-operated apparatus, such as a keyboard-type calculator, with the capacity for the receipt therein of information contained in electrical data signals.

In attaining the foregoing and other objects, the invention provides an interface system having switches connected in parallel with the key-operated switches of the keyboard apparatus and circuitry for successively operating such interface system switches in accordance with separate information content of electrical data signals. In specific application to the aforesaid keyboard calculator, the invention provides an interface system wherein electrical data signals are received and stored for separate release of numeric information therein in respective integer and decimal parts, wherein a decoder receives such stored signals as separately released and selectively operates switches connected in parallel with the switches operable by calculator numeric keyboard keys and wherein further switches connected in parallel with switches operated by calculator keyboard function keys are operated at other preselected times. A timing controller suitably time spaces and sequences the generation of signals for such operation of the system switches.

The foregoing and other objects and features of the invention will be evident from the following detailed description of a particularly preferred embodiment of the invention and from the drawings wherein like reference numerals identify like parts throughout.

DETAILED DESCRIPTION OF THE PREFERRED EMBODIMENT

Figure 1:
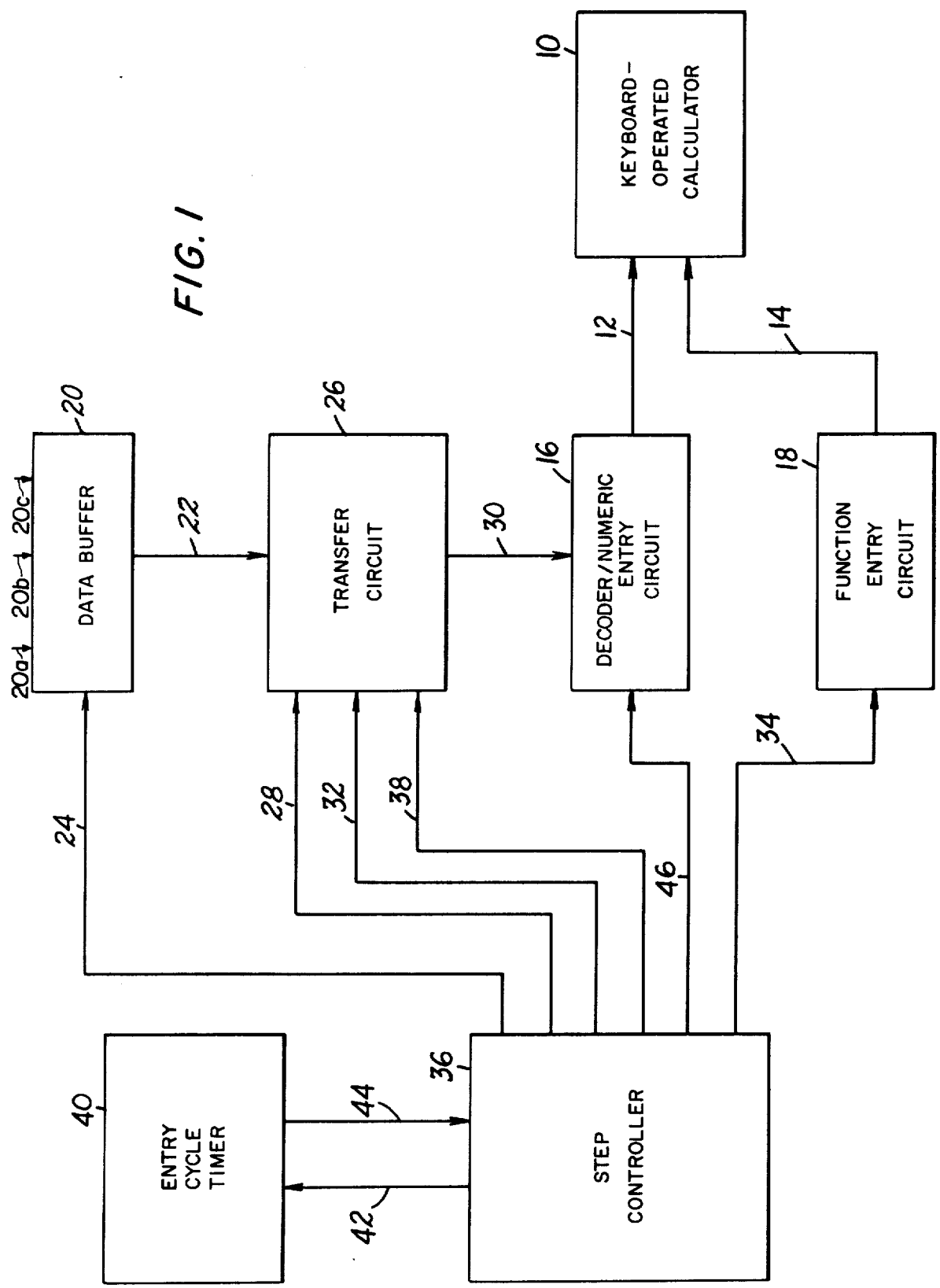
FIG. 1 is a block diagram of a preferred system according with the invention, shown in conjunction with numeric and function key switches of a calculator.

Calculator 10 of FIG. 1 may comprise any of the desk-top or hand held keyboard-operated calculators in widespread current use, for example, a Texas Instrument SR 2500 desk-top calculator. As discussed above, such calculators include first and second groups of switches operated respectively on depression of numeric and function keys. Lines 12, of FIG. 1 represent multiple pairs of conductors introduced into the calculator in accordance with this invention, each pair connected to the terminals of a distinct numeric key switch and lines 14 represent multiple pairs of conductors, each pair connected to the terminals of a distinct function key switch. Decoder/numeric entry circuit 16 controls lines 12 and function entry circuit 18 controls line 14. For this purpose, circuit 16 includes a switching circuit in each separate pair of lines 12 which is operable to interconnect the conductors of such line pair with the same effect in the calculator as if a calculator keyboard key were depressed. Circuit 18 includes a like switching circuit in each separate pair of lines 14.

Electrical data signals to be processed by calculator 10 are received over lines 20a, 20b and 20c and stored in data buffer 20. The buffer so stores the data signals that the numeric information content thereof is releasable onto lines 22 in separate integer and decimal parts in response to a signal on line 24.

For purposes of explanation, a specific example of numeric information content of the data signals will be considered wherein the number has an integer part with tens and units value and a decimal part with tenths value, e.g., the number 96.7. Further, for clarity, it will be assumed that such number is data simply to be transferred to the calculator processor part.

Transfer circuit 26 receives data signals as above furnished on lines 22 and is responsive to a control signal on line 28 to transfer to output lines 30 those data signals indicative of the tens value of the number, i.e., nine. Circuit 16 responds to such line 30 signal by operating the switching circuit therein connected by lines 12 in parallel with the calculator switch operable by depression of the calculator nine key.

At a time suitably spaced from the occurrence of such line 28 control signal, a further control signal occurs on line 32. Transfer circuit 26 is responsive to this control signal to transfer to output lines 30 those data signals on lines 22 which are indicative of the units value, i.e., six, of the number being considered. Circuit 16 responds to these line 30 signals by operating the switching circuit therein connected by lines 12 in parallel with the calculator switch operable by depression of the calculator six key.

At this stage of its operation, the FIG. 1 interface system has simply informed the calculator of two successive digit values, the weighting of which is now provided by operation of the switching circuit in circuit 18 connected by lines 14 in parallel with the calculator switch operable by depression of the calculator decimal-point key. Circuit 18 operates such switch therein responsively to occurrence of a control signal on the one of lines 34 assigned to decimal-point identification, as discussed more particularly below in connection with FIG. 2. Such line 34 decimal-point control signal occurs successively to, and suitably time spaced from, the line 32 control signal.

Step controller 36, which generates the above-discussed signals on lines 24, 28, 32 and 34, now generates another control signal on line 38, time spaced from the line 34 control signal. Transfer circuit 26 is responsive to such line 38 control signal to transfer to output lines 30 those data signals on lines 22 which are indicative of the tenths value, i.e., seven, of the number being considered. Circuit 16 responds to these line 30 signals by operating the switching circuit therein connected by lines 12 in parallel with the calculator switch operable by depression of the calculator seven key.

For transferring the number thus entered into the calculator into the calculator processor part, controller 36 now generates another control signal time spaced from the line 38 control signal on the one of lines 34 assigned to the calculator equals (=) function. On occurrence of this line 34 signal, circuit 18 operates the switching circuit therein connected by lines 14 in parallel with the calculator switch operable by depression of the calculator equals (=) key.

Controller 36 preferably includes a pulse counter whose output counts serve to generate the sequential signals required on lines 24, 28, 32, 34 and 38. In such embodiment, the counter is serviced with clock pulses and started and reset by entry cycle timer 40 communicating with the controller over lines 42 and 44. In this embodiment, the controller employs certain counting steps to time space operation of the numeric entry switches of the interface system by further control signals generated on lines 46, thereby avoiding such misoperation as occurs in key-rollover.

Figure 2:
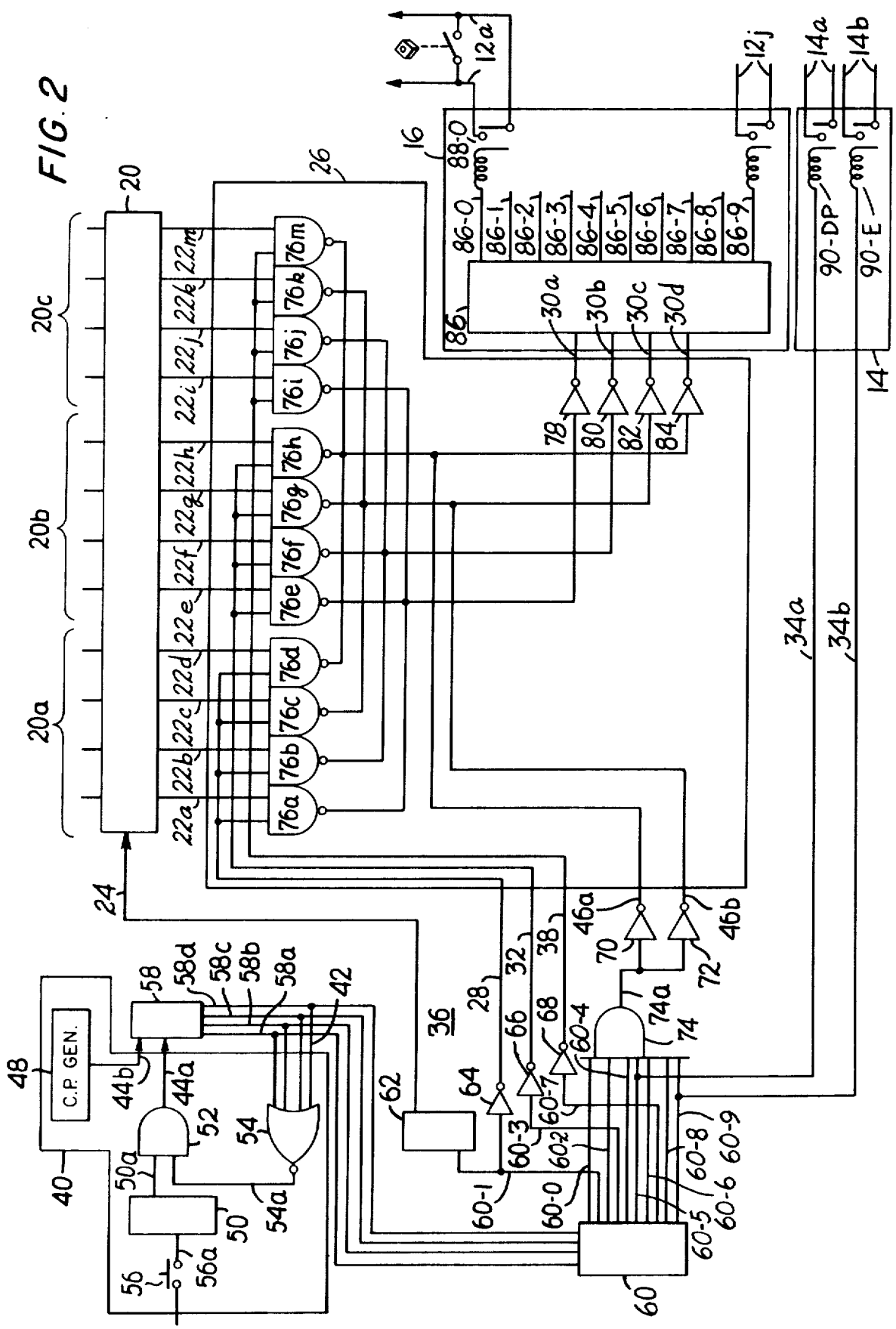
FIG. 2 is an electrical schematic diagram of circuitry suitable for embodying the system of FIG. 1.

Turning to FIG. 2, preferred circuitry for entry cycle timer 40 of FIG. 1 includes clock pulse generator 48, monostable multivibrator 50, gates 52 and 54 and switch 56.

Step controller 36 includes BCD (binary coded decimal) counter 58, BCD decoder 60, monostable multivibrator 62, inverters 64, 66, 68, 70 and 72 and gate 74.

Data buffer 20 comprises a three-decade BCD latcher having input line groups 20a, 20b and 20 c assigned respectively to the tens, units and tenths values of the numeric information in the electrical data signals to be processed. Corresponding groups of output lines are identified as 22a –d, 22e–h and 22i–m.

Transfer unit 26 includes a three-decade multiplexer having gate groups 76a–d, 76e–h and 76i–m and inverters 78, 80, 82 and 84.

Numeric entry circuit 16 includes BCD decoder 86 and ten reed relays of which relays 88-0 and 88-9 are shown. Function entry circuit 18 includes reed relays 90-DP (decimal-point) and 90-E (equals).

In operation of the FIG. 2 circuitry, switch 56 is depressed to initiate data entry. The triggering input of multivibrator 50 is thereupon connected through switch 56 to a voltage supply (not shown) and the multivibrator output on line 50a goes from a previous positive (+5V) potential (HI) to ground (0 volts) potential (LO) for a preselected time period explained below. Gate 52 is of type providing a HI output on line 44a only when both of the inputs thereto on lines 50a and 54a are HI and provides a LO output under all other input conditions. With line 50a now LO, gate 52 thus applies a LO to line 44a.

The clear input of counter 58 is connected to line 44a and the counter is maintained in a reset or cleared state when line 44a is HI, under which condition counter output lines 58a–d are all LO. With line 44a now LO, the counter commences to count clock pulses finished thereto on line 44b by clock pulse generator 48 up to a count of nine whereupon the counter sets its output lines LO. As such count commences, lines 58a–d go selectively HI, the lines being respectively BCD-weighted as one, two, four and eight weight. Line 58a thus goes HI on the first count, line 58b goes HI on the second count, lines 58a and 58b jointly go HI on the third count, etc.

Gate 54 has its inputs connected by lines 42 to lines 58a–d. This gate is of type providing a HI output on line 54a only when all inputs thereto are LO and provides a LO output on line 54a under all other input conditions. Thus, when any of lines 58a–d is HI, which condition applies throughout the count, line 54a is maintained LO, thus insuring that gate 52 maintains line 44a LO to permit continuance of counting up to nine count. The above-referenced preselected time period during which multivibrator 50 maintains line 50a LO is chosen as exceeding the time between two clock pulses and as less than the time between the first and tenth clock pulses whereby multivibrator 50 is operative to start the count but is ineffective to itself terminate or prolong the count. Rather, gate 54 terminates the count by applying a HI to line 54a coincident with the tenth clock pulse. At that time both inputs to gate 52 are HI and the gate applies a HI to line 44a preventing further counting until recurrence of operation of switch 56.

Decoder 60 is operative on the first count (line 58a HI) to provide a LO solely on its output line 60-1, maintaining all other output lines 60-0 and 60-2 through 60-9 HI. Multivibrator 62 is triggered by such line 60-1 LO and its changed output on line 24 transfers the signals on lines 20a, 20b and 20c onto lines 22a–22m. Concurrently, inverter 64 applies a HI to line 28, thereby strobing the signals on lines 22a–22d respectively to inverters 78–84 and over lines 30a–d to decoder 86.

At their ends not connected directly to lines 86-0 through 86-9, the coils of relays 88-0 through 88-9 are connected to a potential equal to the potential selected as the HI level for the system. Decoder 86, when not presented with signals on lines 30a-d indicative of a valid BCD code, i.e., a BCD code identifying decimal values zero through nine, maintains all of lines 86-0 through 86-9 HI. Under such invalid code conditions, no potential difference exists across any coil of relays 88-0 through 88-9 and no switching contacts thereof are closed. Accordingly, there is no entry of numeric information in the calculator by the interface system. Conversely, under conditions when lines 30a-d are HI, LO, LO, HI and present a valid BCD code (the BCD code 1001), decoder 86 renders output line 86-9 LO, energizing the coil and thereby closing the switch of relay 88-9 and entering the numeral line in the calculator.

The numeric decoding operation for the signals on lines 22a-d, attending occurrence of the first count, is repeated for the signals on lines 22e-h on occurrence of the third count at which time line 60-3 goes LO and line 32 is rendered HI by inverter 66.

On the fifth count, line 60-5 goes LO, thereby applying a LO through line 34a to the left end of the coil of relay 90-DP. With the right end of this coil connected, as above-discussed for relays 88, to the system HI potential, the coil of relay 90-DP is energized and its switch closed, thereby entering a decimal point in the calculator through lines 14a. This provides indication that the two data previously entered in the calculator by decoder 86 are tens and units values.

On the seventh count, decoder 60 drives line 60-7 LO and inverter 68 applies a HI to line 38 whereby gates 76a-76m gate data signals on lines 22i-22m therethrough to inverters 78-84 and to lines 30a-30d. Decoder 86 is responsive to the BCD code of these signals to apply a LO to one of lines 86-0 through 86-9, thereby entering a further number into the calculator, i.e., indicative of tenths in the amount of such further number.

On the ninth count, decoder 60 drives line 60-9 LO and hence line 34b LO. The coil of relay 90-E is accordingly energized, closing the switch thereof in lines 14b and directing the calculator to transfer the entered number to its processor part.

The interface system of FIG. 2 includes facility for spacing data and function entries in the manner in which they are spaced by an operator in manual depression of keys. For this purpose, i.e., avoidance of so-called key rollover, gate 74 receives inputs from lines 60-0, 60-2, 60-4, 60-6 and 60-8. This gate is of type providing a HI output on line 74a when any input thereto is LO. Under all other input conditions, gate 74 maintains line 74a HI. Line 74a is thus LO on counts zero, two, four, six and eight, namely, prior to entry of data during the first count, and for individual counts between counts during which other data is furnished the calculator. When line 74a is HI, inverters 70 and 72 drive lines 46a and 46b LO whereby inverters 82 and 84 apply HI signals to lines 30c and 30d, thus providing an invalid code (0011) to decoder 86, the BCD code indicative of the number 12. All of lines 86-0 through 86-9 are accordingly maintained HI and no numeric directive is furnished the calculator. At all such times, lines 34 and 34b are HI with no function entry being furnished the calculator.

Figure 3:
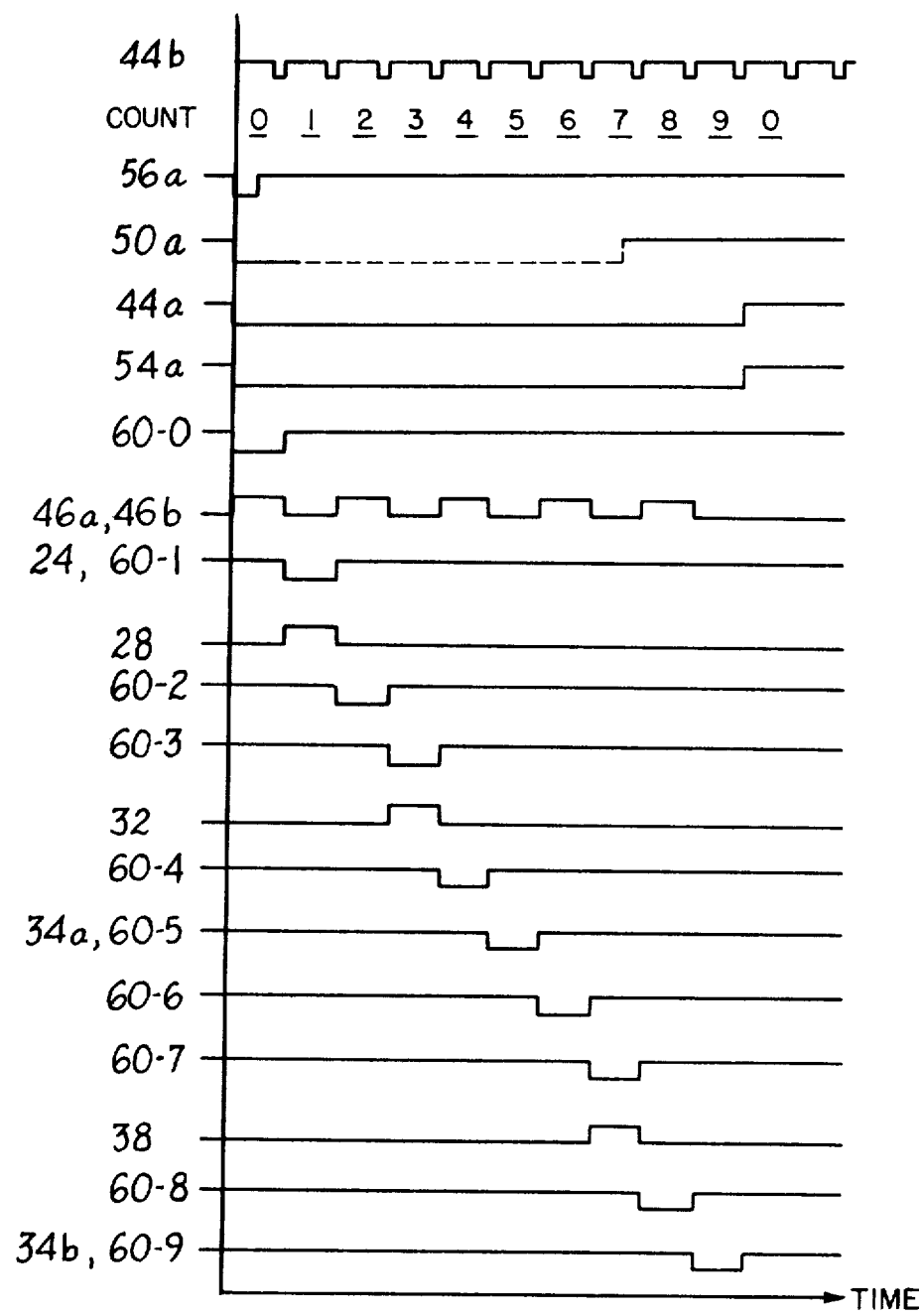
FIG. 3 is a timing diagram facilitating an understanding of the invention.

The foregoing timing events are further shown in FIG. 3 wherein the selected time period during which line 50a is maintained LO extends from before the first clock pulse on line 44b to just before the eight clock pulse. Accordingly, line 50a goes HI during count seven thereby permitting the line 54a signal to drive line 44a HI on occurrence of the tenth clock pulse during count nine. As will be appreciated, numbers having digit values beyond the tens, units and tenths denominations above discussed can be readily processed by expanding the stage count and decoding capacity of units 40 and 36, by expanding buffer 20 and the gate groups and the key rollover circuitry of unit 36.

In implementing the FIG. 1 system by the FIG. 2 circuitry, components may be selected as follows:

| Unit | Manufacturer | Product No. |
|---|---|---|
| 48 | Motorola | 4024 |
| 50, 62 | Texas Instruments | 74121 |
| 52 | Texas Instruments | 7408 |
| 54 | Texas Instruments | 7425 (1/2) |
| 58 | Texas Instruments | 7490 |
| 60 | Texas Instruments | 7445 |
| 64-72, 78-84 | Texas Instruments | 7404 (1/6) |
| 74 | Texas Instruments | 7430 |
| 76 | Texas Instruments | 7400 |
| 86 | Texas Instruments | 7445 |
| 20 | Texas Instruments | 74176 (3) |
| 88, 90 | GORDOS | 831A-4 |

Various changes and modifications may evidently be introduced in the interface system discussed above without departing from the present invention. By way of example, while switch 56 is preferably constituted by a manually operable switch member accessible to the operator of the calculator for shifting to electrical data signal entry, it may comprise a switching circuit responsive to an external controller. Also, the required several control signals may be generated in the requisite time succession by circuit arrangements other than that particularly shown. As mentioned heretofore, the invention is applicable to keyboard-operated apparatus other than numeric calculators, e.g., in usage to enter information contents of data signals selectively in multiple steps with suitable time spacing between such separate entries. The preferred embodiments are accordingly intended in an illustrative and not in a limiting sense. The true spirit and scope of the invention is defined in the following claims.

What is claimed is:

1. In combination, for processing information contained in manipulative input signals or electrical data signals:
    a. a calculator having a keyboard and switches manually operable by depression of keys of said keyboard for entry of said manipulative input signals in said calculator; and
    b. a system for entry of said electrical data signals in said calculator, comprising
        1. transfer circuit means for receiving said data signals and responsive to a first control signal to provide first output signals indicative of first preselected content of said data signals and responsive to a second control signal to provide second output signals indicative of second preselected content of said data signals,
        2. a plurality of switching means, each connected in parallel with a distinct one of said calculator key-operable switches,
        3. decoder means receiving said first and second output signals from said transfer circuit means for operating said switching means in accordance with such preselected information contents of said data signals for entry of said contents in said calculator; and 4. step controller means for generating said first and second second control signals successively in predetermined time-spaced relation, and for maintaining said switching means unoperated for a preselected time period following each such operation thereof.

2. The invention claimed in claim 1 wherein said step controller means includes counter means for generating output signals indicative of counting states thereof, said first an said second control signals being constituted by selective first and second of said counter means output signals.

3. The invention claimed in claim 2 further including circuit means responsive to output signals of said counter means other than said first and said second counter means output signals for maintaining each of said switching means unoperated for a preselected time following such operation thereof.

4. The invention claimed in claim 2 wherein said step controller means further includes a pulse generator furnishing pulses to said counter means for counting thereby and gating means operative to terminate such counting after the counting of a predetermined number of said pulses.

5. In combination, for processing information having integer and decimal content and contained in manipulative input signals or electrical data signals:
  a. a calculator having a keyboard and switches manually operable by depression of numeric keys of said keyboard and by depression of function keys of said keyboard for entry of said manipulative input signals in said calculator, said function keys being inclusive of at least a decimal point key; and
  b. a system for entry of said electrical data signals in said calculator, comprising:
    1. transfer circuit means for receiving said data signals and responsive to a first control signal to provide first output signals indicative of integer content of said data signals and responsive to a second control signal to provide second output signals indicative of decimal content of said data signals,
    2. a plurality of first switching means, each connected in parallel with a distinct one of said calculator numeric key-operable switches,
    3. decoder/numeric entry means receiving said first and second output signals from said transfer means for operating said first switching means in accordance with the numeric information therein for entry of such numeric information in said calculator,
    4. second switching means connected in parallel with said calculator decimal point key and operated responsively to a third control signal, and
    5. step controller means for generating said first, said third and said second control signals respectively successively in predetermined time-spaced relation.

6. The invention claimed in claim 5 wherein said step controller means includes counter means for generating output signals indictive of counting states thereof, said first, said second and said third control signals being constituted by selective first, second and third of said counter means output signals.

7. The invention claimed in claim 5 wherein said system further includes circuit means for maintaining each of said first and said second switching means unoperated for a preselected time period following such operation thereof.

8. The invention claimed in claim 6 further including circuit means responsive to output signals of said counter means other than said first, said second and said third counter means output signals for maintaining each of said first and second switching means unoperated for a preselected time period following such operation thereof.

* * * * *